(12) United States Patent
Nilsson et al.

(10) Patent No.: US 7,096,108 B2
(45) Date of Patent: Aug. 22, 2006

(54) BRAKE SYSTEM WITH DISTRIBUTED ELECTRONIC CONTROL UNITS INCORPORATING FAILSAFE MODE

(75) Inventors: Peter Nilsson, Orkelljunga (SE); Anders Lindqvist, Landkrona (SE)

(73) Assignee: Haldex Brake Products AB, (SE)

( * ) Notice: Subject to any disclaimer, the term of this patent is extended or adjusted under 35 U.S.C. 154(b) by 0 days.

(21) Appl. No.: 11/088,319

(22) Filed: Mar. 24, 2005

(65) Prior Publication Data

US 2005/0165531 A1 Jul. 28, 2005

Related U.S. Application Data

(63) Continuation-in-part of application No. 10/672,807, filed on Sep. 26, 2003.

(51) Int. Cl.
*B60T 8/62* (2006.01)
(52) U.S. Cl. .............. 701/70; 701/48; 701/76; 701/92; 303/122.04; 303/122.05; 303/189
(58) Field of Classification Search ............ 701/48, 701/70, 71, 76, 78, 81, 82, 83, 91, 92; 303/2, 303/3, 5, 6.01, 8, 9.61–9.62, 9.72, 15, 16, 303/20, 121, 154, 122.04, 122.05, 189
See application file for complete search history.

(56) References Cited

U.S. PATENT DOCUMENTS

| | | | |
|---|---|---|---|
| 4,653,614 A | 3/1987 | Price et al. .................. 188/70 |
| 4,701,854 A * | 10/1987 | Matsuda ..................... 701/76 |
| 4,852,699 A | 8/1989 | Karnopp et al. ............ 188/72.2 |
| 4,946,007 A | 8/1990 | Pederson et al. .......... 188/24.14 |
| 4,974,704 A | 12/1990 | Miller et al. .............. 188/24.24 |
| 5,012,901 A | 5/1991 | Campbell et al. ........... 188/71.4 |
| 5,255,962 A * | 10/1993 | Neuhaus et al. ............ 303/188 |
| 5,579,219 A * | 11/1996 | Mori et al. .................... 700/4 |
| 5,788,023 A | 8/1998 | Schoner et al. ............. 188/72.7 |
| 5,829,557 A | 11/1998 | Halasy-Wimmer et al. . 188/162 |
| 6,209,966 B1 | 4/2001 | Mies .............................. 303/3 |
| 6,318,513 B1 | 11/2001 | Dietrich et al. ............ 188/72.7 |
| 6,354,671 B1 | 3/2002 | Feldmann et al. ............ 303/15 |
| 6,669,308 B1 * | 12/2003 | Aurich et al. ................. 303/15 |
| 2004/0081193 A1* | 4/2004 | Forest et al. ................. 370/458 |
| 2005/0127749 A1* | 6/2005 | Hartmann et al. ........... 303/122 |

FOREIGN PATENT DOCUMENTS

WO WO 03071150 8/2003

* cited by examiner

*Primary Examiner*—Gary Chin
(74) *Attorney, Agent, or Firm*—St. Onge Steward Johnston & Reens, LLC

(57) ABSTRACT

A brake system for a heavy vehicle includes a control network, a brake component, a central control unit, and a distributed electronic control unit. The central control unit generates central control signals adapted to control the brake component, which control signals are transmitted to the brake component over the control network. The distributed electronic control unit receives the central control signals, controls the brake component in accordance with the central control signals if the central control signals are received during expected time periods, and controls the brake component in accordance with an alternative control scheme if the central control signals are not received during the expected time periods.

31 Claims, 4 Drawing Sheets

BRAKE SYSTEM WITH DISTRIBUTED ELECTRONIC CONTROL UNITS INCORPORATING FAILSAFE MODE

CROSS-REFERENCE TO RELATED APPLICATIONS

The present application is a continuation-in-part of currently pending U.S. patent application Ser. No. 10/672,807, filed Sep. 26, 2003.

FIELD OF THE INVENTION

The present invention relates generally to an electrically controlled braking system which is intended for use with wheeled vehicles, and more particularly to a control network for such a braking system which incorporates distributed electronic control units in addition to a central control unit.

BACKGROUND OF THE INVENTION

Traditional braking systems for motor vehicles include conventional hydraulic or pneumatic brakes associated with two or more wheels of the vehicle. Such conventional brakes are actuated by pressurized fluid or compressed air. When actuated, the brakes exert a force on a disk or drum which spins in conjunction with the wheel of the vehicle in order to create frictional forces which resist rotation of the wheel. Traditionally, control signals have been transmitted to each of the brake system's actuators mechanically, or by a hydraulic or pneumatic control circuit. However, it has more recently been proposed to employ a central control unit to generate electronic control signals and to use such electronic control signals to control actuation of a vehicle's brakes. This type of electronic control scheme has become even more prevalent in view of modern brake systems which now often include not only conventional hydraulic or pneumatic brake actuator functionality, but also supplemental electronic functions such as antilock protection (ABS) and/or electronic braking force distribution (EBV) between the front and rear axles.

U.S. Pat. No. 6,354,671 discloses a brake system in which electronic signals produced by a central controller in response to sensor input are used to at least partially control actuation of a vehicle's brakes. System redundancy is provided in the form of a back-up pneumatic control circuit. Should the electronic control unit malfunction, the braking system is controlled by the back-up pneumatic control circuit in much the same way as traditional brake systems operate.

U.S. Pat. No. 6,209,966 discloses a brake system which includes two electronic control units, which operate independently of each other, and which provide control signals in response to sensor input to a brake cylinder assigned to a wheel and a braking pressure modulator valve which is fluid-connected to the brake cylinder. The braking pressure modulator has a first electric actuating element, which can be activated by a first of the two control units, and a second electric actuating element which acts in the same direction when activated as the first electric actuating element. The second electric actuating element can be activated by the second electronic control unit at the same time as the first electric actuating element is being activated by the first electronic control unit. Thus, system redundancy is provided by providing two separate electronic control units, each of which controls one of two separate electric actuating elements associated with each wheel.

It has also been suggested to create a redundant electronic control system where two separate control networks are employed. Such a system employs one or more central control units provided to control, in response to sensor input, two or more brake assemblies, each having a brake actuator incorporating an electronic control unit. Central control unit or units is or are in electrical communication with the electronic control unit of each of the brake assemblies via at least two electronic control networks. All of the electronic control units of all brake assemblies are connected to each electronic control network. By providing such an arrangement, should one electronic control network fail, the other electronic control network would theoretically maintain control of all brake assemblies.

However, all three of the above-discussed prior art systems suffer from a number of disadvantages. One common disadvantage of all three systems is that the brake assemblies are essentially "dumb" in that no control signal generation is performed thereby. While it is true that in the last of the above-described systems each of the brake assemblies may be provided with an electronic control unit, the functionality of this electronic control unit is limited, for example, to processing (e.g. translating) control signals received from the central control unit in order to cause the brake to actuate. The electronic control units of the brake assemblies do not receive input from vehicle sensors, and do not generate (as opposed to manipulate) control signals. Thus, it is required for the central control unit in each of the above-described systems to process all sensor inputs and to generate all control signals for all brake assemblies. This is disadvantageous for several reasons.

It is often the case that the vehicle sensors are located remotely from the central control unit. As such, the time it takes for sensor signals to travel from the sensors to the central control unit, and then for the control signals, once generated, to travel from the central control unit to the brake assemblies may be relatively long, thereby causing the brake assemblies to respond to sensor input relatively slowly. It would be more desirable, particularly in situations where the vehicle sensors are located in closer proximity to the brake assemblies than to the central control unit, for the control signals to be generated at the brake assemblies themselves by "smart" brake assemblies.

Another disadvantage of requiring the central control unit to process all sensor inputs and to generate all control signals for all brake assemblies is that the processing of a large number of sensor signals and the generation of a large number of control signals by a single processor may take a relatively long period of time. This problem is exacerbated when the vehicle includes a large number of sensors and/or brake assemblies. It would be more desirable for control signals affecting only a single brake assembly and/or a group of brake assemblies to be generated at the brake assemblies themselves by "smart" brake assemblies, thereby freeing up the resources of the central control unit for the generation of control signals which affect many or all of the brake assemblies.

The disadvantage of all three of the above-described systems relating to the fact that the brake assemblies disclosed therein are essentially "dumb" (in that no control signal generation is performed thereby) may lead to additional problems as well.

As discussed above, in many automotive system applications, electronic control safety is currently approached at two levels: At a basic level, a mechanical system provides the degree of safety that is considered sufficient for safe operation; On top of this basic mechanical system, a computer system provides optimized performance. In case the computer system fails, the mechanical system takes over. A known anti-lock braking system (ABS) is a typical example of this approach: if the computer fails, the conventional mechanical brake is still operational. In the near future, this approach to safety will reach its limit for two reasons: (1) The improved price/performance of the microelectronic components will make the implementation of fault-tolerant computer systems cheaper than the implementation of mixed (computer/mechanical) systems—as a consequence, there will be a cost pressure to eliminate the redundant mechanical system; and (2) As the performance of the computer controlled system is further improved, the fall-back to the inferior performance of the mechanical system increasingly constitutes a safety risk for the operator who is accustomed to the high performance of the computer controlled system.

Both trends favor the deployment of fault-tolerant real-time systems that will provide the specified service despite a failure of any one of their components. It should be no surprise then that there are several such fault-tolerant real-time systems which have been developed, examples of which include the FlexRay™ communication system, the time triggered control area network (TTCAN), and the Time-Triggered Protocol TTP®/C. In general terms, each of these systems uses time as its underlying driving force, i.e., all activities of a system are carried out in response to the passage of certain points in time. This control strategy is realized based on a time division multiple access (TDMA) bus access strategy. The TDMA bus access strategy is based on the principle that the individual communication controllers on the bus have time slots allocated where exactly one communication controller is allowed to send information on the bus. It is thus possible to predict the latency of all messages on the bus, which guarantees hard real-time message delivery. If a control message is not received when expected, the system component which expected to receive the message "knows" that a communication error has occurred.

Such systems are beneficial in that messages are acted upon only if received in a timely manner. For example, in many vehicle systems, such as braking systems, it is critical that control signals be transmitted to, received by, and acted upon by brake actuators almost instantaneously. This is true because the vehicle condition which prompted the control signal to be generated in the first place may only exist for a very short time (i.e., a fraction of a second). If the vehicle condition no longer exists by the time the control signal which that condition prompted reaches the actuator, and the actuator acts upon that signal, the results may not only be unintended, but may actually be hazardous. When the above-described fault-tolerant real-time systems are employed, such may be avoided, since if the control signals are not received in a timely manner when expected, they may be ignored.

While this approach of ignoring untimely control signals may be more desirable than acting upon delayed signals, such an approach is still disadvantageous. This is true because oftentimes it is far more desirable that the actuator take some action (even if such action cannot be the ideal action determined by the system controller due to the communication error) rather than taking no action at all. However, in known prior art systems having "dumb" system actuators, the actuators cannot make a determination of a proper action to be taken. Instead, the actuators either act upon the control signals (if received in a timely manner), or ignore the control signals (if not received when expected).

What is desired, therefore, is an electrically controlled braking system which is intended for use with wheeled vehicles, which allows brake assemblies to respond to sensor input relatively quickly, which does not require the central control unit to process all sensor inputs and to generate all control signals for all brake assemblies, which frees up the resources of the central control unit for the generation of control signals which affect many or all of the brake assemblies, which in addition to a central control unit also includes "smart" brake assemblies capable of processing sensor input and generating control signals in response thereto, which employs a fault-tolerant real-time communications network, and which includes "smart" brake assemblies capable of switching to a failsafe mode of alternative control should the fault-tolerant real-time communications network fail.

SUMMARY OF THE INVENTION

Accordingly, it is an object of the present invention to provide an electrically controlled braking system which is intended for use with wheeled vehicles.

Another object of the present invention is to provide an electrically controlled braking system having the above characteristics and which allows brake assemblies to respond to sensor input relatively quickly.

A further object of the present invention is to provide an electrically controlled braking system having the above characteristics and which does not require the central control unit to process all sensor inputs and to generate all control signals for all brake assemblies.

Still another object of the present invention is to provide an electrically controlled braking system having the above characteristics and which frees up the resources of the central control unit for the generation of control signals which affect many or all of the brake assemblies.

Yet a further object of the present invention is to provide an electrically controlled braking system having the above characteristics and which in addition to a central control unit also includes "smart" brake assemblies capable of processing sensor input and generating control signals in response thereto.

Yet another object of the present invention is to provide an electrically controlled braking system having the above characteristics and which employs a fault-tolerant real-time communications network.

Still a further object of the present invention is to provide an electrically controlled braking system having the above characteristics and which includes "smart" brake assemblies capable of switching to a failsafe mode of alternative control should the fault-tolerant real-time communications network fail.

These and other objects of the present invention are achieved in one embodiment by provision of a brake system for a heavy vehicle including a control network, a brake component, a central control unit, and a distributed electronic control unit. The central control unit generates central control signals adapted to control the brake component, which control signals are transmitted to the brake component over the control network. The distributed electronic control unit receives the central control signals, controls the brake component in accordance with the central control signals if the central control signals are received during expected time periods, and controls the brake component in accordance with an alternative control scheme if the central control signals are not received during the expected time periods.

In some embodiments, the control network comprises a fault-tolerant real-time control network. In certain of these embodiments, the fault-tolerant real-time control network employs a time division multiple access (TDMA) bus access strategy. In some embodiments, the alternative control scheme comprises actuating the brake component or releasing the brake component. In some embodiments, the brake system further includes a second brake component, the central control unit further generates central control signals adapted to control a second brake component, the control signals adapted to control the second brake component being transmitted to the second brake component over the control network, and the alternative control scheme comprises controlling the brake component based upon the control signals adapted to control the second brake component.

In some embodiments, the brake system further includes a second central control unit generating second central control signals adapted to control the brake component, and the alternative control scheme comprises controlling the brake component based upon the second control signals generated by the second central control unit. In certain of these embodiments, the second central control signals are transmitted to the brake component over the control network. In certain of these embodiments, the second central control signals are transmitted to the brake component over a second control network different than the control network. In certain embodiments, the second central control unit comprises at least one of a parking brake control unit and an antilock brake system control unit.

In some embodiments, the brake system further includes at least one vehicle performance sensor generating and transmitting to the distributed electronic control unit sensor signals, and the alternative control scheme comprises controlling the brake component based upon the sensor signals.

In accordance with another embodiment of the present invention, a brake system for a heavy vehicle includes a plurality of brake components, at least one vehicle performance sensor, a central control unit receiving sensor signals from the at least one vehicle performance sensor and generating central control signals for controlling the plurality of brake components based on the received sensor signals, and at least one distributed electronic control unit receiving the central control signals. The at least one distributed electronic control unit controls at least one of the brake components in accordance with at least one of the central control signals if the at least one of the central control signals directed to control of the at least one of the brake components is received during expected time periods, and controls the at least one of the brake component in accordance with an alternative control scheme if the at least one of the central control signals directed to control of the at least one of the brake components is not received during the expected time periods.

In some embodiments, at least the central control unit and the at least one distributed electronic control unit communicate via a control network. In certain of these embodiments, the control network comprises a fault-tolerant real-time control network. In certain of these embodiments, the fault-tolerant real-time control network employs a time division multiple access (TDMA) bus access strategy. In some embodiments, the alternative control scheme comprises actuating the at least one of the brake components or releasing the at least one of the brake components. In some embodiments, the alternative control scheme comprises controlling the at least one of the brake components based upon at least one of the central control signals directed to control of another of the brake components.

In some embodiments, the brake system further includes a second central control unit generating second central control signals adapted to control the plurality of brake components, and the alternative control scheme comprises controlling the at least one of the brake components based upon the second central control signals generated by the second central control unit. In certain of these embodiments, the central control signals and the second central control signals are transmitted to the plurality of brake components over a common control network. In certain of these embodiments, the central control signals and the second central control signals are transmitted to the plurality of brake components over a two separate control networks. In certain embodiments, the second central control unit comprises at least one of a parking brake control unit and an antilock brake system control unit.

In some embodiments, the alternative control scheme comprises controlling the brake component based upon the sensor signals. In some embodiments, the distributed electronic control unit generates local control signals for controlling only one of the plurality of brake components. In some embodiments, the distributed electronic control unit generates local control signals for controlling at least two of the plurality of brake components located on a common axle of the vehicle. In some embodiments, the at least one vehicle performance sensor comprises a plurality of vehicle performance sensors, at least one of which provides sensor signals to both the central control unit and the distributed electronic control unit. In some embodiments, the at least one vehicle performance sensor comprises a plurality of vehicle performance sensors, at least one of which provides sensor signals only to the central control unit. In some embodiments, the at least one vehicle performance sensor comprises a plurality of vehicle performance sensors, at least one of which provides sensor signals only to the distributed electronic control unit.

In some embodiments, the brake system further includes a second distributed electronic control unit, and the at least one vehicle performance sensor comprises a plurality of vehicle performance sensors, at least one of which provides sensor signals to the central control unit, the distributed electronic control unit and the second distributed electronic control unit. In some embodiments, the brake system further includes a second distributed electronic control unit, and the at least one vehicle performance sensor comprises a plurality of vehicle performance sensors, at least one of which provides sensor signals to the distributed electronic control unit and the second distributed electronic control unit. In some embodiments, at least one of the vehicle performance sensors comprises part of one of the plurality of brake components. In some embodiments, at least one of the vehicle performance sensors is separate from the plurality of brake components. In some embodiments, the brake system further includes a manual input for overriding the central control signals and the local control signals.

The invention and its particular features and advantages will become more apparent from the following detailed description considered with reference to the accompanying drawings.

DETAILED DESCRIPTION OF AN EMBODIMENT OF THE INVENTION

Figure 1:
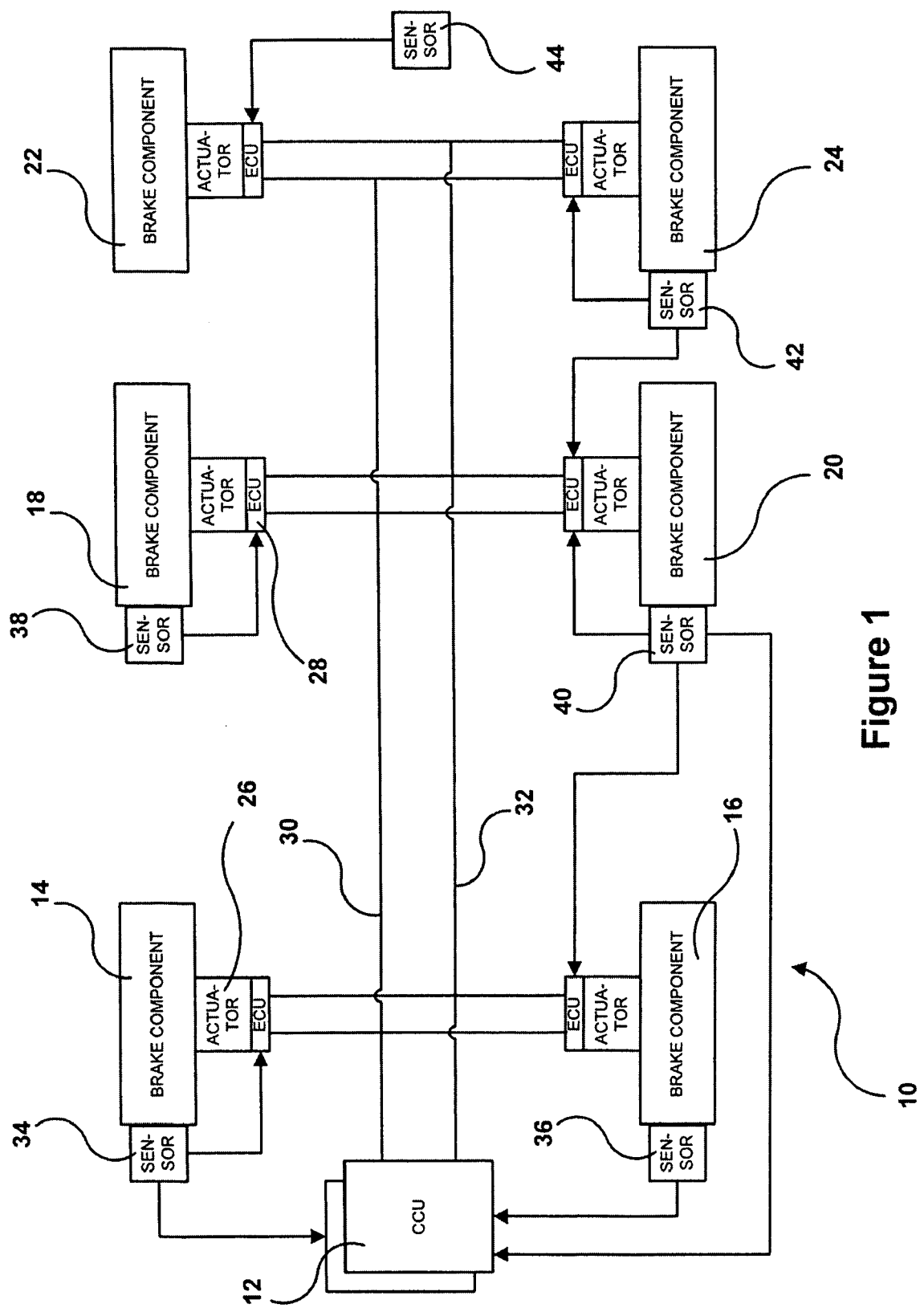
FIG. 1 is a schematic view of an electrically controlled braking system in accordance with an embodiment of the present invention.

Referring first to FIG. 1, an electrically controlled braking system 10 in accordance with the present invention is shown. Braking system 10 includes at least one central control unit 12 which generates central control signals. Braking system 10 also includes a plurality of brake components 14, 16, 18, 20, 22, 24. While six brake components 14, 16, 18, 20, 22, 24 are shown in FIG. 1, it should be understood that braking system 10 may include a greater or lesser number of brake components.

Each of brake components 14, 16, 18, 20, 22, 24 is responsive to the central control signals generated by control unit(s) 12. More particularly, each of brake components 14, 16, 18, 20, 22, 24 includes a brake actuator 26 incorporating a distributed electronic control unit 28 which distributed electronic control unit 28 causes brake actuator 26 to operate in response to the central control signals generated by central control unit(s) 12. As this central control aspect of such electronically controllable brake components are known in the art, a detailed discussion of the operation thereof is not presented herein. Each of brake components 14, 16, 18, 20, 22, 24 may be actuated by electrical force, hydraulic force, pneumatic force, combinations of these, and/or by any other appropriate force.

Braking system 10 includes at least one control network for transmitting central control signals from central control unit(s) 12 to each of brake components 14, 16, 18, 20, 22, 24. Numerous configurations for the control network(s) are possible. For example, a single control network may be provided. Alternately, in order to provide system redundancy multiple control networks may be provided. In braking system 10 shown in FIG. 1, two control networks 30, 32 are provided, with each of brake components 14, 16, 18, 20, 22, 24 being connected to each control network 30, 32. Both control networks 30, 32 may transmit central control signals generated by a single central control unit 12, or each control network 30, 32 may transmit central control signals generated by a different of two central control units 12.

In addition to central control signals being generated by central control unit(s) 12, local control signals are generated by each of distributed electronic control units 28 which local control signals are used to control only one vehicle actuator 26 rather than controlling all vehicle actuators 26, as is the case with central control unit(s) 12. This allows certain functions of vehicle actuators 26 which do not affect operation of others of vehicle actuators 26 to be controlled locally by distributed electronic control units 28, while reserving control by central control unit(s) 12 only for those circumstances where coordination of multiple vehicle actuators 26 is required. Such localized distributed control provides several advantages over completely centralized control, including quicker response times (e.g., due to shorter electrical signal travel and reduced processing by the central controller) and more reliable system operation (e.g., due to system redundancy).

Thus, in some cases, it may be desired that particular functions of actuators 26 be controlled completely locally, in which cases actuation signals transmitted to actuators 26 are based solely on sensor signals received by distributed electronic control units 28. In other cases it may be desired that particular functions of actuators 26 be controlled solely by central control unit(s) 12, in which cases, actuation signals transmitted to actuators 26 are based solely on central control signals received by distributed electronic control units 28 from central control unit(s) 12. In still other cases, it may be desired that particular functions of actuators 26 be controlled by both distributed electronic control units 28 and central control unit(s) 12. In these cases, actuation signals transmitted to actuators 26 are based on both central control signal received by distributed electronic control units 28 from central control unit(s) 12 and sensor signals received by distributed electronic control units 28. Any conflicts between central control signal received by distributed electronic control units 28 from central control unit(s) 12 and local control signals generated by distributed electronic control units 28 may be resolved by distributed electronic control units 28 before actuation signals are transmitted to actuators 26.

As alluded to above, system 10 includes a plurality of vehicle sensors which detect and produce sensor signals indicative of one or more operating parameters of the vehicle. Examples of such vehicle sensors include wheel speed sensors, pitch sensors, vehicle height sensors, vehicle weight sensors, and many others. Sensor signals are processed by central control unit(s) 12 and/or distributed electronic control units 28 according to various control schemes which may be stored thereon in order to generate central control signals and/or local control signals. As the processing of sensor signals in order to generate control signals is known in the art, such is not discussed herein in detail.

Depending upon the particular vehicle parameter which is being sensed and whether central and/or local control of brake components 14, 16, 18, 20, 22, 24 is desired with respect to such parameter, sensors may be connected in various ways within system 10. In cases where control of a single brake component is desired both centrally and locally based upon the input of a sensor, that sensor 34 may provide sensor signals to both central control unit(s) 12 and a single distributed electronic control unit 28. In cases where control of a single or multiple brake components is desired only centrally based upon the input of a sensor, that sensor 36 may provide sensor signals only to central control unit(s) 12. In cases where control of a single brake component is desired only locally based upon the input of a sensor, that sensor 38 may provide sensor signals only to a single distributed electronic control unit 28. In cases where control of multiple brake components is desired both centrally and locally based upon the input of a sensor, that sensor 40 may provide sensor signals to both central control unit(s) 12 and multiple distributed electronic control units 28. In cases where control of multiple brake components is desired only locally based upon the input of a sensor, that sensor 42 may provide sensor signals only to multiple distributed electronic control units 28. Each sensor may comprise a part of a brake component, as is the case with sensors 34, 36, 38, 40, 42 shown in FIG. 1, or may be separate therefrom as is the case with sensor 44 also shown in FIG. 1.

Figure 2:
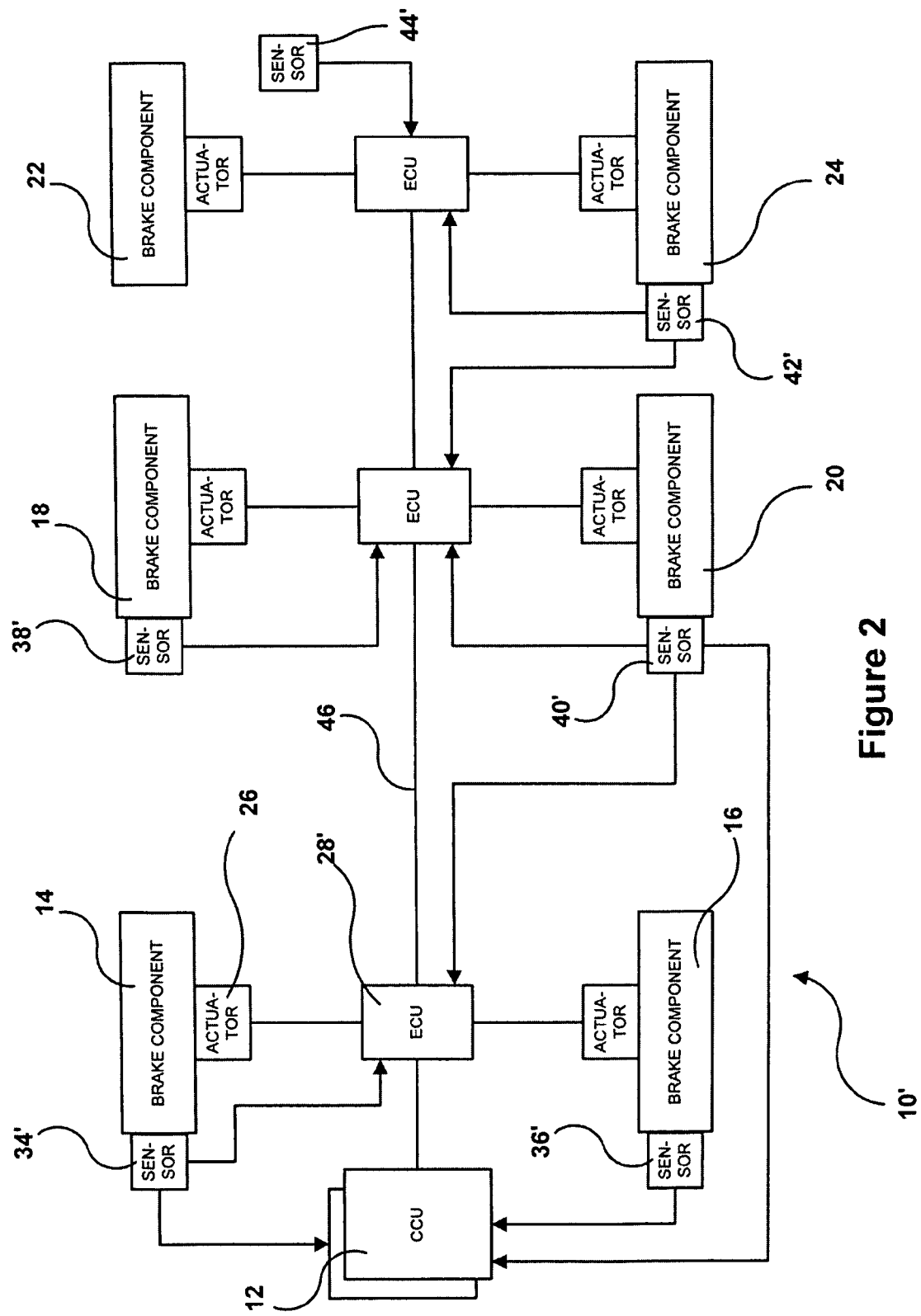
FIG. 2 is a schematic view of an electrically controlled braking system in accordance with another embodiment of the present invention.

Referring now to FIG. 2, rather than each of distributed electronic control units 28 being associated with a single brake component 14, 16, 18, 20, 22, 24, distributed electronic control units 28' may be associated with a subset of brake component 14, 16, 18, 20, 22, 24. In the exemplary embodiment shown in FIG. 2, each distributed electronic control unit 28' is associated with a pair of actuators on a single vehicle axle, and is connected to central control unit(s) 12 via a single control network 46.

As is the case with the embodiment shown in FIG. 1, depending upon the particular vehicle parameter which is being sensed and whether central and/or local control of brake components 14, 16, 18, 20, 22, 24 is desired with respect to such parameter, sensors may be connected in various ways within system 10' shown in FIG. 2. In cases where control of a single subset of brake components is desired both centrally and locally based upon the input of a sensor, that sensor 34' may provide sensor signals to both central control unit(s) 12 and a single distributed electronic control unit 28'. In cases where control of a single or multiple subsets of brake components is desired only centrally based upon the input of a sensor, that sensor 36' may provide sensor signals only to central control unit(s) 12. In cases where control of a single subset of brake components is desired only locally based upon the input of a sensor, that sensor 38' may provide sensor signals only to a single distributed electronic control unit 28'. In cases where control of multiple subsets of brake components is desired both centrally and locally based upon the input of a sensor, that sensor 40' may provide sensor signals to both central control unit(s) 12 and multiple distributed electronic control units 28'. In cases where control of multiple subsets of brake components is desired only locally based upon the input of a sensor, that sensor 42' may provide sensor signals only to multiple distributed electronic control units 28'. Each sensor may comprise a part of a brake component, as is the case with sensors 34', 36', 38', 40', 42' shown in FIG. 2, or may be separate therefrom as is the case with sensor 44' also shown in FIG. 2.

Figure 3:
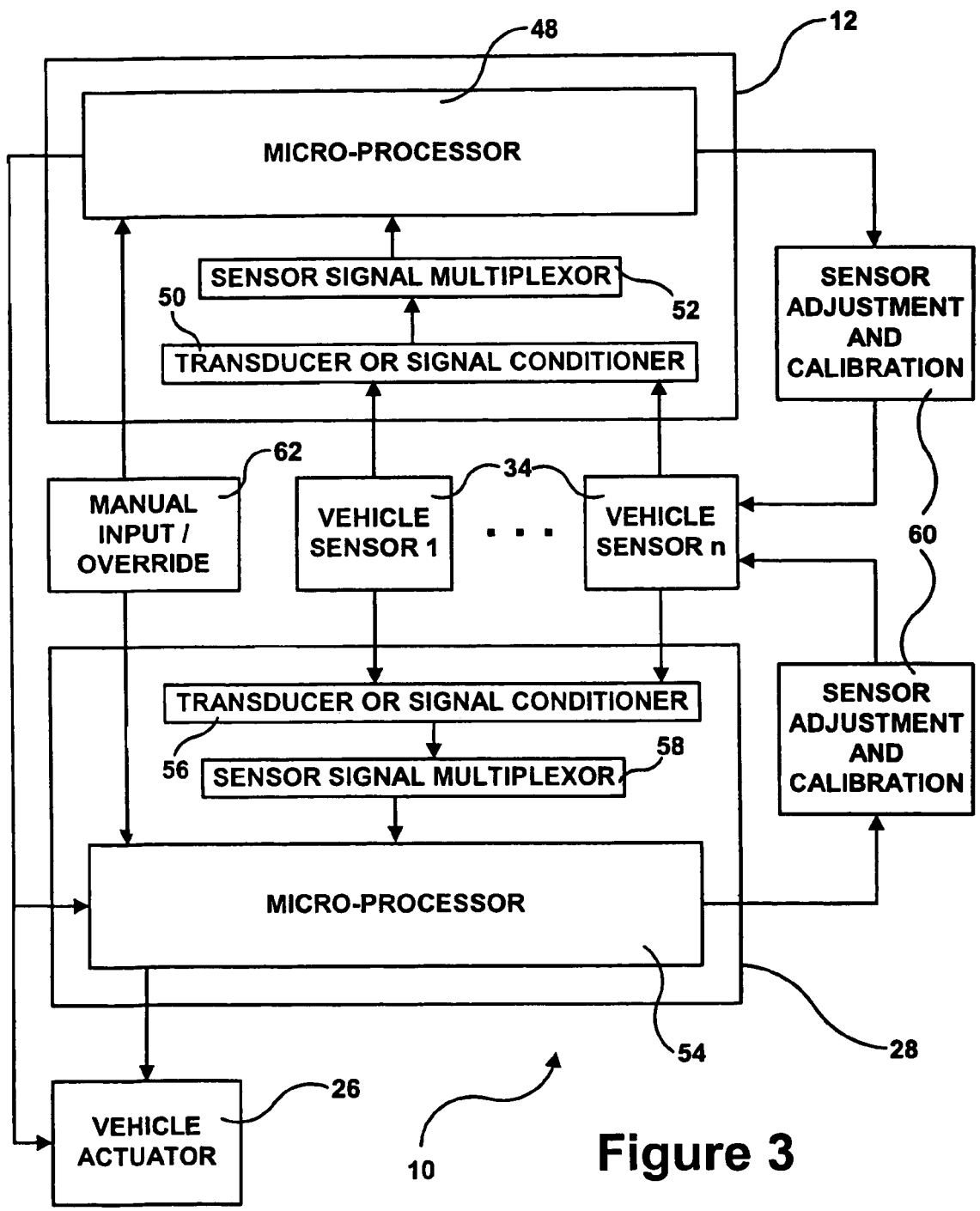
FIG. 3 is a block diagram illustrating an aspect of operation the electrically controlled braking systems of FIGS. 1 and 2.

Referring now to FIG. 3, each central control unit 12 includes a microprocessor 48 which is employed to process sensor signals received from sensors 34 and generate central control signals. Because the signals produced by sensors 34 may have one of a variety of different formats, a transducer or signal conditioner 50 may be provided for translating the format of the signals into a format useable by microprocessor 48. Also, because a plurality of sensor signals may be transmitted simultaneously by sensors 34, a sensor signal multiplexor 52 may be provided for avoiding conflicts between sensor signals. The conditioned and multiplexed signals are then transmitted to microprocessor 48. Each distributed electronic control unit 28 similarly includes a microprocessor and may include a transducer or signal conditioner 56 and/or a sensor signal multiplexor 58.

System 10 may allow microprocessor(s) 48 and/or microprocessors 54 to control operation of sensors 34 via a sensor adjustment and calibration signal 60 or the like. For example, under certain conditions it may be desirable for vehicle sensors 34 to provide more detailed data than is typically provided or to provide data more or less often than is typical.

System 10 may include the ability to receive manual input and/or override commands 62 from the vehicle operator in order to manually control vehicle actuators 26 and/or override commands issued by microprocessor(s) 48 and/or microprocessors 54. Such manual input and/or override commands 62 may be fed to microprocessor(s) 48 and/or microprocessors 54 for transmission thereby to actuators 26, or may be fed directly to actuators 26 without passing through microprocessor(s) 48 and/or microprocessors 54.

Brake components 14, 16, 18, 20, 22, 24 are in communication with some type of energy supply for supplying power for operating the components. The energy supply may comprise, for example, a pressurized air reservoir or a battery for supplying power in the form of pneumatic power or electrical power respectively. In certain embodiments, the same centralized energy supply supplies power to all components centrally controlled by system 10. In other embodiments, various components centrally controlled by system 10 may be supplied power by various supplies of energy.

In addition to controlling standard braking operations, central control unit(s) 12 and/or distributed electronic control units 28 may control various additional braking functions, such as antilock brake systems (ABS) and electronic braking force distribution (EBV) systems, as well as other vehicle systems, such as vehicle suspension and dynamic stability systems.

One or both of control networks 30, 32 (FIG. 1) or control network 46 (FIG. 2) may comprise a fault-tolerant real-time control network which uses time as its underlying driving force, i.e., all activities of system 10, 10' based upon control signals passing over control network(s) 30, 32, 46 are carried out in response to the passage of certain points in time. As is known in the art, such a control strategy may be realized based on a time division multiple access (TDMA) bus access strategy, which in turn is based on the principle that the individual communication controllers on the bus have time slots allocated where exactly one communication controller is allowed to send information on the bus. It is thus possible to predict the latency of all messages on the bus, which guarantees hard real-time message delivery. If a control signal is not received when expected, brake component 14, 16, 18, 20, 22, 24 which expected to receive the control signal "knows" that a communication error has occurred. Because such systems are known (examples of which include the FlexRay™ communication system, the time triggered control area network (TTCAN), and the Time-Triggered Protocol TTP®/C), a detailed description of such systems is not provided herein.

Unlike such known systems, however, rather than brake components 14, 16, 18, 20, 22, 24 simply ignoring control signals which are not received when expected, brake components 14, 16, 18, 20, 22, 24 of system 10, 10', being "smart" components, are capable of continuing to function despite the communications error. More specifically, central control unit 12 generates central control signals adapted to control brake components 14, 16, 18, 20, 22, 24, which control signals are transmitted to the brake components 14, 16, 18, 20, 22, 24 over the control network(s) 30, 32, 46. Distributed electronic control unit(s) 28, 28' receive the central control signals, and either (i) control the brake components 14, 16, 18, 20, 22, 24 in accordance with the central control signals if the central control signals are received during expected time periods, or (ii) control the brake components 14, 16, 18, 20, 22, 24 in accordance with an alternative control scheme if the central control signals are not received during the expected time periods.

Figure 4:
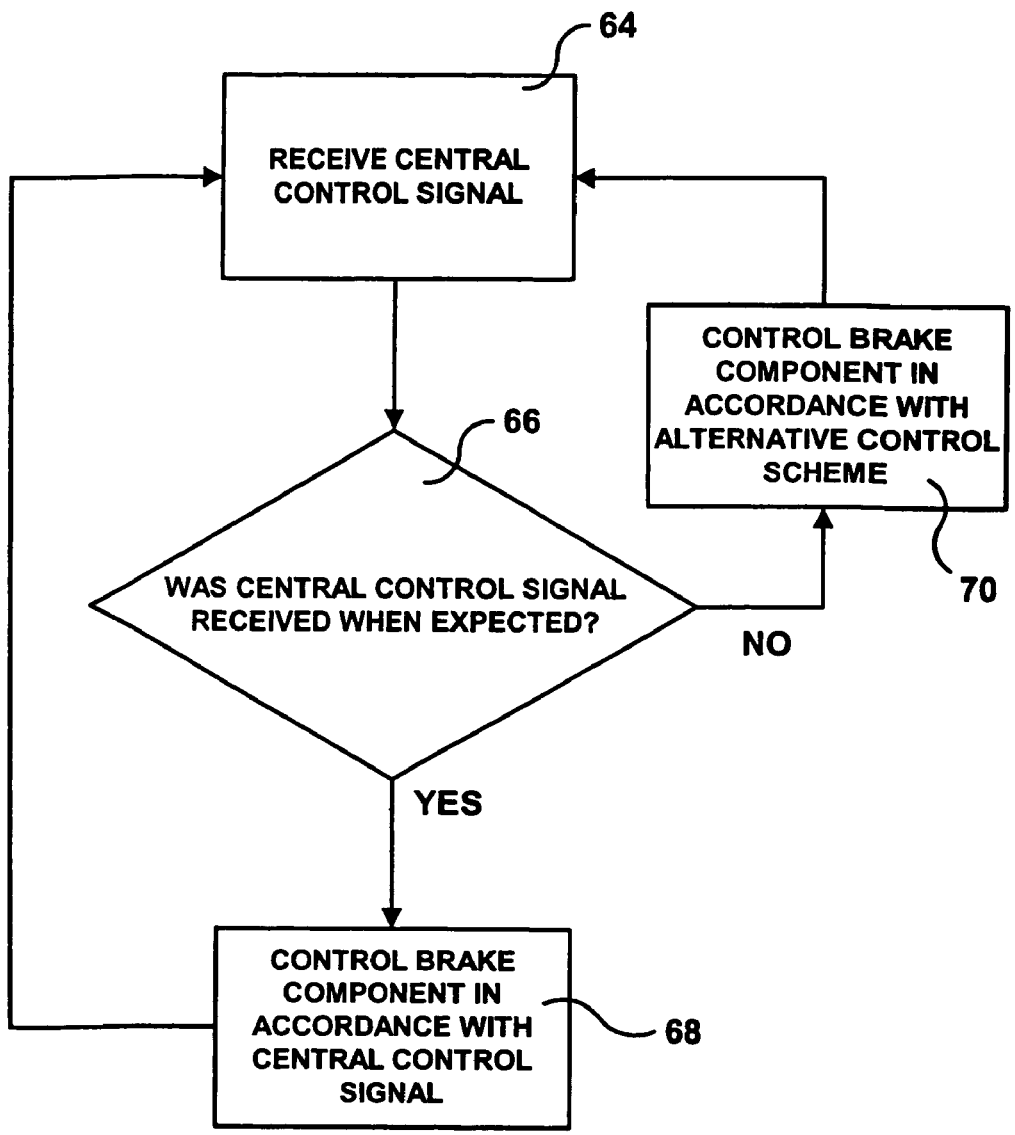
FIG. 4 is a flow chart illustrating another aspect of operation the electrically controlled braking systems of FIGS. 1 and 2.

Referring nor to FIG. 4, this decision process is graphically shown. At block 64, distributed electronic control unit(s) 28, 28' receive the central control signals. Distributed electronic control unit(s) 28, 28' then, at block 66 determine whether or not the received control signals were received when expected (i.e., during the expected time periods). If the control signals were, in fact, received when expected, distributed electronic control unit(s) 28, 28' control brake components 14, 16, 18, 20, 22, 24 in accordance with the received central control signals (block 68). However, as shown at block 70, if the control signals were not received when expected (i.e., they are delayed), distributed electronic control unit(s) 28, 28' control brake components 14, 16, 18, 20, 22, 24 in accordance with an alternative control scheme as described more fully below.

The alternative control scheme may be as simple as actuating the brake components 14, 16, 18, 20, 22, 24 or releasing the brake components 14, 16, 18, 20, 22, 24 when a communication failure occurs. Each of brake components 14, 16, 18, 20, 22, 24 may have its own default failsafe position (e.g., fully released, fully applied, partially applied, etc.), to which distributed electronic control unit(s) 28, 28' cause each of brake components 14, 16, 18, 20, 22, 24 to actuate in the case of a communications failure. All of brake components 14, 16, 18, 20, 22, 24 may be caused to actuate to the same position, or some may be caused to actuate to one position, while others are caused to actuate to another position.

Another potential for alternative control scheme is for control signals adapted to control a second of brake components 14, 16, 18, 20, 22, 24 to be used to control a first of brake components 14, 16, 18, 20, 22, 24 when communications errors occur in the transmission of control signals to the first of brake components 14, 16, 18, 20, 22, 24. Of course, the second of brake components 14, 16, 18, 20, 22, 24 may be selected such that it is expected that the control signals for controlling the second of brake components 14, 16, 18, 20, 22, 24 are most likely to be similar to the control signals for controlling the first of brake components 14, 16, 18, 20, 22, 24. For example, first and second of brake components 14, 16, 18, 20, 22, 24 may be on the same vehicle axle, may be located adjacent to one another on the same side of the vehicle, etc.

A further alternative for alternative control scheme is when system 10 includes two central control units 12 generating control signals adapted to control the brake components 14, 16, 18, 20, 22, 24. In this case, the brake component 14, 16, 18, 20, 22, 24 for which communications received from one of central control units 12 are failing may be controlled based upon the control signals generated by a second of central control units 12 which is not failing. In some cases, both central control units 12 may be transmitting control signals over the same control network 30, 32, 46 (as may be the case with the embodiments shown in FIGS. 1 and 2). In other cases, the control networks may be transmitting control signals over two separate control networks 30, 32 (as may be the case with the embodiment shown in FIG. 1). Both central control units 12 may be brake system control units (for the sake of redundancy as explained in more detail above), or one central control unit may be a brake system control unit, while the other central control unit is a parking brake control unit, an antilock brake system control unit, etc.

Still another alternative for alternative control scheme is when the brake system further includes at least one vehicle performance sensor 34, 36, 38, 40, 42, 34', 36', 38', 40', 42' generating and transmitting to the distributed electronic control unit 28, 28' sensor signals. The alternative control scheme may involve controlling the brake component 14, 16, 18, 20, 22, 24 based upon the sensor signals. For example, if the vehicle is moving (or is moving above a threshold speed), some of brake components may be actuated to one position, while if the vehicle is stationary (or is moving below the threshold speed), those brake components may be actuated to another position. Many other circumstances when sensor input can be used by "smart" brake components can be easily conceived by one skilled in the art.

The present invention, therefore, provides an electrically controlled braking system which is intended for use with wheeled vehicles, which allows brake assemblies to respond to sensor input relatively quickly, which does not require the central control unit to process all sensor inputs and to generate all control signals for all brake assemblies, which frees up the resources of the central control unit for the generation of control signals which affect many or all of the brake assemblies, which in addition to a central control unit also includes "smart" brake assemblies capable of processing sensor input and generating control signals in response thereto, which employs a fault-tolerant real-time communications network, and which includes "smart" brake assemblies capable of switching to a failsafe mode of alternative control should the fault-tolerant real-time communications network fail.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A brake system for a heavy vehicle, said brake system comprising:
    a control network;
    a brake component;
    a central control unit generating central control signals adapted to control said brake component, the control signals being transmitted to said brake component over said control network; and
    a distributed electronic control unit receiving the central control signals, said distributed electronic control unit controlling said brake component in accordance with the central control signals if the central control signals are received during expected time periods, and controlling said brake component in accordance with an alternative control scheme if the central control signals are not received during the expected time periods.

2. The brake system of claim 1 wherein said control network comprises a fault-tolerant real-time control network.

3. The brake system of claim 2 wherein said fault-tolerant real-time control network employs a time division multiple access (TOMA) bus access strategy.

4. The brake system of claim 1 wherein the alternative control scheme comprises actuating said brake component or releasing said brake component.

5. The brake system of claim 1:
    further comprising a second brake component;
    wherein said central control unit further generates central control signals adapted to control a the second brake component, the control signals adapted to control the second brake component being transmitted to the second brake component over said control network; and
    wherein the alternative control scheme comprises controlling said brake component based upon the control signals adapted to control the second brake component.

6. The brake system of claim 1:
    further comprising a second central control unit generating second central control signals adapted to control said brake component; and
    wherein the alternative control scheme comprises controlling said brake component based upon the second control signals generated by the second central control unit.

7. The brake system of claim 6 wherein the second central control signals are transmitted to said brake component over said control network.

8. The brake system of claim 6 wherein the second central control signals are transmitted to said brake component over a second control network different than said control network.

9. The brake system of claim 6 wherein the second central control unit comprises at least one of a parking brake control unit and an antilock brake system control unit.

10. The brake system of claim 1:
further comprising at least one vehicle performance sensor generating and transmitting to said distributed electronic control unit sensor signals; and
wherein the alternative control scheme comprises controlling said brake component based upon the sensor signals.

11. A brake system for a heavy vehicle, said brake system comprising:
a plurality of brake components;
at least one vehicle performance sensor;
a central control unit receiving sensor signals from said at least one vehicle performance sensor and generating central control signals for controlling said plurality of brake components based on the received sensor signals; and
at least one distributed electronic control unit receiving the central control signals, said at least one distributed electronic control unit controlling at least one of said brake components in accordance with at least one of the central control signals if the at least one of the central control signals directed to control of the at least one of said brake components is received during expected time periods, and controlling the at least one of said brake components in accordance with an alternative control scheme if the at least one of the central control signals directed to control of the at least one of said brake components is not received during the expected time periods.

12. The brake system of claim 11 wherein at least said central control unit and said at least one distributed electronic control unit communicate via a control network.

13. The brake system of claim 12 wherein the control network comprises a fault-tolerant real-time control network.

14. The brake system of claim 11 wherein the fault-tolerant real-time control network employs a time division multiple access (TDMA) bus access strategy.

15. The brake system of claim 11 wherein the alternative control scheme comprises actuating the at least one of said brake components or releasing the at least one of said brake components.

16. The brake system of claim 11 wherein the alternative control scheme comprises controlling the at least one of said brake components based upon at least one of the central control signals directed to control of another of said brake components.

17. The brake system of claim 11:
further comprising a second central control unit generating second central control signals adapted to control said plurality of brake components; and
wherein the alternative control scheme comprises controlling the at least one of said brake components based upon the second central control signals generated by the second central control unit.

18. The brake system of claim 17 wherein the central control signals and the second central control signals are transmitted to said plurality of brake components over a common control network.

19. The brake system of claim 17 wherein the central control signals and the second central control signals are transmitted to said plurality of brake components over a two separate control networks.

20. The brake system of claim 17 wherein the second central control unit comprises at least one of a parking brake control unit and an antilock brake system control unit.

21. The brake system of claim 11 wherein the alternative control scheme comprises controlling the at least one of said brake components based upon the sensor signals.

22. The brake system of claim 11 wherein said distributed electronic control unit generates local control signals for controlling only one of said plurality of brake components.

23. The brake system of claim 11 wherein said distributed electronic control unit generates local control signals for controlling at least two of said plurality of brake components located on a common axle of the vehicle.

24. The brake system of claim 11 wherein said at least one vehicle performance sensor comprises a plurality of vehicle performance sensors, at least one of which provides sensor signals to both said central control unit and said distributed electronic control unit.

25. The brake system of claim 11 wherein said at least one vehicle performance sensor comprises a plurality of vehicle performance sensors, at least one of which provides sensor signals only to said central control unit.

26. The brake system of claim 11 wherein said at least one vehicle performance sensor comprises a plurality of vehicle performance sensors, at least one of which provides sensor signals only to said distributed electronic control unit.

27. The brake system of claim 11 further comprising a second distributed electronic control unit and wherein said at least one vehicle performance sensor comprises a plurality of vehicle performance sensors, at least one of which provides sensor signals to said central control unit, said distributed electronic control unit and said second distributed electronic control unit.

28. The brake system of claim 11 further comprising a second distributed electronic control unit and wherein said at least one vehicle performance sensor comprises a plurality of vehicle performance sensors, at least one of which provides sensor signals to said distributed electronic control unit and said second distributed electronic control unit.

29. The system of claim 11 wherein at least one of said said at least one vehicle performance sensor comprises part of one of said plurality of brake components.

30. The system of claim 11 wherein said at least one vehicle performance sensor is separate from said plurality of brake components.

31. The brake system of claim 11 further comprising a manual input for overriding the central control signals and the local control signals generated by the at least one distributed electronic control unit.

* * * * *